United States Patent
Ratasuk et al.

(10) Patent No.: US 12,445,222 B2
(45) Date of Patent: Oct. 14, 2025

(54) EXTENDED CHANNEL QUALITY REPORT FOR 16-QUADRATURE AMPLITUDE MODULATION IN NARROWBAND INTERNET OF THINGS

(71) Applicant: Nokia Technologies Oy, Espoo (FI)

(72) Inventors: Rapeepat Ratasuk, Inverness, IL (US); David Bhatoolaul, Swindon (GB); Nitin Mangalvedhe, Hoffman Estates, IL (US); Srinivasan Selvaganapathy, Bangalore (IN)

(73) Assignee: Nokia Technologies Oy, Espoo (FI)

(*) Notice: Subject to any disclaimer, the term of this patent is extended or adjusted under 35 U.S.C. 154(b) by 478 days.

(21) Appl. No.: 17/906,148

(22) PCT Filed: Mar. 4, 2021

(86) PCT No.: PCT/EP2021/055465
§ 371 (c)(1),
(2) Date: Sep. 12, 2022

(87) PCT Pub. No.: WO2021/185590
PCT Pub. Date: Sep. 23, 2021

(65) Prior Publication Data
US 2023/0109684 A1    Apr. 13, 2023

(30) Foreign Application Priority Data
Mar. 20, 2020  (IN) .............................. 202041012191

(51) Int. Cl.
*H04L 1/00* (2006.01)
*H04W 74/0833* (2024.01)
(52) U.S. Cl.
CPC ....... *H04L 1/0026* (2013.01); *H04W 74/0833* (2013.01)

(58) Field of Classification Search
None
See application file for complete search history.

(56) References Cited

U.S. PATENT DOCUMENTS

2012/0113849 A1* 5/2012 Luo .................... H04L 1/06 370/252
2017/0288808 A1  10/2017 Blankenship et al.
2022/0361157 A1* 11/2022 Sun .................... H04W 72/23

FOREIGN PATENT DOCUMENTS

CN    103283168 A    9/2013
CN    106134120 A    11/2016
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.1.0, Jun. 2022, pp. 1-1128.
(Continued)

*Primary Examiner* — Anh Ngoc M Nguyen
(74) *Attorney, Agent, or Firm* — McCarter & English, LLP

(57) ABSTRACT

According to a first embodiment, a method may include transmitting to at least one user equipment at least one configuration of channel quality indication comprising at least one indication of whether downlink transmissions associated with 16-quadrature amplitude modulation is supported. The method may further include receiving, based upon at least one condition being satisfied, from the at least one user equipment, at least one extended channel quality indication report.

20 Claims, 6 Drawing Sheets

(56) References Cited

FOREIGN PATENT DOCUMENTS

| | | |
|---|---|---|
| CN | 108352940 A | 7/2018 |
| CN | 110061811 A | 7/2019 |
| WO | 2020/028865 A1 | 2/2020 |

OTHER PUBLICATIONS

"3rd Generation Partnership Project; Technical Specification Group Radio Access Network; Evolved Universal Terrestrial Radio Access (E-UTRA); Requirements for support of radio resource management (Release 17)", 3GPP TS 36.133, V17.1.0, Mar. 2021, 3886 pages.

"3rd Generation Partnership Project; Technical Specification Group Radio Access Network; Evolved Universal Terrestrial Radio Access (E-UTRA); Physical layer procedures (Release 17)", 3GPP TS 36.213, V17.1.0, Mar. 2022, pp. 1-583.

Office action received for corresponding European Patent Application No. 21710429.8, dated Oct. 2, 2024, 6 pages.

"New WID on Rel-17 enhancements for NB-IoT and LTE-MTC", 3GPP TSG RAN Meeting #86, RP-193264, Agenda: 10.1.1, Huawei, Dec. 9-12, 2019, 5 pages.

International Search Report and Written Opinion received for corresponding Patent Cooperation Treaty Application No. PCT/EP2021/055465, dated May 25, 2021, 13 pages.

"CSI definition for MTC", 3GPP TSG RAN WG1 Meeting #82bis, R1-155036, Agenda: 7.2.1.5, Ericsson, Oct. 5-9, 2015, pp. 1-6.

"Quality report in Msg3 and connected mode in LTE-MTC", 3GPP TSG-RAN WG1 Meeting #98, R1-1908022, Agenda: 6.2.1.5, Ericsson, Aug. 26-31, 2019, 7 pages.

Office action received for corresponding Indian Patent Application No. 202247058377, dated Dec. 20, 2022, 6 pages.

Office action received for corresponding Chinese Patent Application No. 202180030857.6, dated May 6, 2024, 10 pages of office action and no page of translation available.

"CQI definition for Rel-13 MTC", 3GPP TSG RAN WG1 Meeting #82, R1-154717, Agenda: 7.2.1.3, MediaTek Inc., Aug. 24-28, 2015, 4 pages.

* cited by examiner

EXTENDED CHANNEL QUALITY REPORT FOR 16-QUADRATURE AMPLITUDE MODULATION IN NARROWBAND INTERNET OF THINGS

RELATED APPLICATION

This application was originally filed as PCT Application No. PCT/EP2021/055465, filed on 4 Mar. 2021, which claims priority from Indian Provisional Application No. 20/204,1012191, filed on 20 Mar. 2020, each of which is incorporated herein by reference in its entirety.

TECHNICAL FIELD

Some example embodiments may generally relate to mobile or wireless telecommunication systems, such as Long Term Evolution (LTE), fifth generation (5G) radio access technology, new rad(NR) access technology, or other communications systems. For example, certain embodiments may relate to systems and/or methods for multiplexing sidelink logical channels having various maximum communication range values.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or 5G radio access technology or NR access technology. 5G wireless systems refer to the next generation (NG) of radio systems and network architecture. A 5G system is mostly built on a 5G NR, but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B (NB) in UTRAN or the evolved NB (eNB) in LTE) may be named next-generation NB (gNB) when built on NR radio, and may be named next-generation eNB (NG-eNB) when built on E-UTRA radio.

SUMMARY

According to a first embodiment, a method may include transmitting to at least one user equipment (UE) at least one configuration of channel quality indication (CQI) comprising at least one indication of whether downlink transmissions associated with 16-quadrature amplitude modulation (QAM) is supported. The method may further include receiving, based upon at least one condition being satisfied, from the at least one UE, at least one extended CQI report.

In a variant, the method may further include transmitting to the at least one UE at least one 16-QAM measurement configuration.

In a variant, the at least one 16-QAM measurement configuration comprises one or more of at least one reference signal, at least one measurement time, and at least one periodic reporting interval.

According to a second embodiment, a method may include receiving from at least one network entity (NE) at least one configuration of channel quality indication (CQI) comprising at least one indication of whether downlink transmissions associated with 16—quadrature amplitude modulation (QAM) is supported. The method may further include transmitting, based upon at least one condition being satisfied, to the at least one NE, at least one extended CQI report.

In a variant, the method may further include receiving from the at least one NE at least one 16-QAM measurement configuration.

In a variant, the at least one 16-QAM measurement configuration comprises one or more of at least one reference signal, at least one measurement time, and at least one periodic reporting interval.

According to a third embodiment and a fourth embodiment, an apparatus can include at least one processor and at least one memory and computer program code. The at least one memory and the computer program code can be configured to, with the at least one processor, cause the apparatus at least to perform a method according to the first embodiment, the second embodiment, and any of their variants.

According a fifth embodiment and a sixth embodiment, an apparatus can include means for performing the method according to the first embodiment, the second embodiment, and any of their variants.

According to a seventh embodiment and an eighth embodiment, a computer program product may encode instructions for performing a process including a method according to the first embodiment, the second embodiment, and any of their variants.

According to a ninth embodiment and a tenth embodiment, a non-transitory computer-readable medium may encode instructions that, when executed in hardware, perform a process including a method according to the first embodiment, the second embodiment, and any of their variants.

According to an eleventh embodiment and a twelfth embodiment, a computer program code may include instructions for performing a method according to the first embodiment, the second embodiment, and any of their variants.

According to a thirteenth embodiment and a fourteenth embodiment, an apparatus may include circuitry configured to perform a process including a method according to the first embodiment, the second embodiment, and any of their variants.

BRIEF DESCRIPTION OF THE DRAWINGS

For proper understanding of example embodiments, reference should be made to the accompanying drawings, wherein.

DETAILED DESCRIPTION

In Third Generation Partnership Project (3GPP) Release (Rel)-17 Work Item (WI) for internet of things (IoT) enhancements, one objective includes specifying 16-quadrature amplitude modulation (QAM) support for narrowband (NB)-IoT. For example, 16-QAM may be specified for unicast in uplink (UL) and downlink (DL), including changes necessary for DL power allocation for narrowband physical downlink shared channel (NPDSCH) and DL transport block size (TBS). This may be specified with a new NB-IoT UE capability or category. For DL, a maximum TBS may be increased, for example by 2× the maximum in Rel-16, while soft buffer size may be specified by modifying at least the existing NB2 UE category. For UL, the maximum TBS may not be increased. Rather, NB-IoT channel quality reporting may be enhanced based on the framework of Rel-14 through Rel-16 to support 16-QAM in DL.

(CE) with an empty payload using a reserved logical channel identifier (LCID). The codepoint/index of "10001" is then used for the MAC CE DL channel quality report. Furthermore, RAN2 introduced a one-byte MAC CE DL channel quality report to support a report with a maximum of 8 bits.

Certain embodiments described herein may have various benefits and/or advantages to overcome the disadvantages described above. For example, some embodiments may improve spectral efficiency range. Thus, certain embodiments are directed to improvements in computer-related technology.

Figure 1:
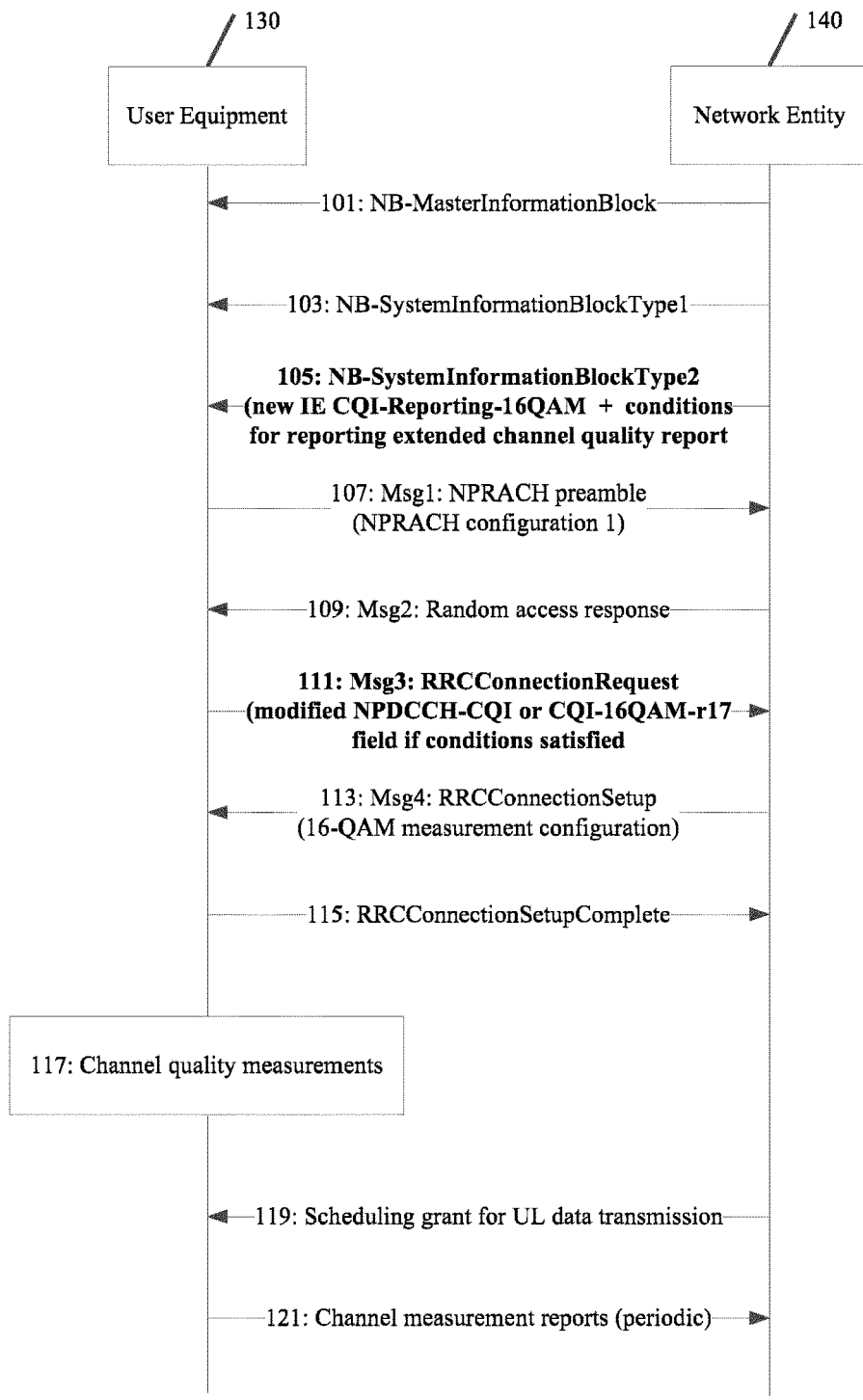
FIG. 1 illustrates an example of a signaling diagram according to certain embodiments.
Figure 5:
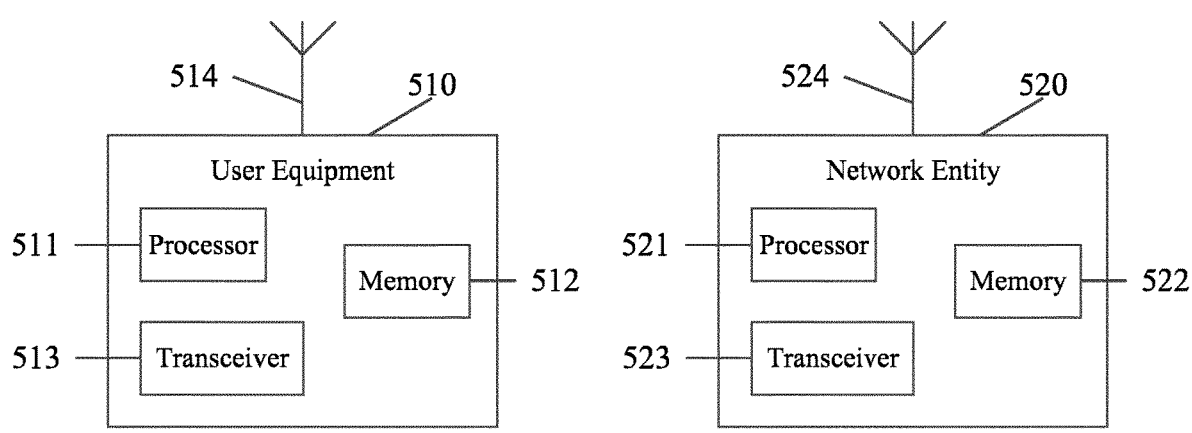
FIG. 5 illustrates an example of various network devices according to certain embodiments.

FIG. 1 illustrates an example of a signaling diagram showing communications between UE 130 and NE 140. UE 130 and NE 140 may be similar to UE 510 and NE 510, as illustrated in FIG. 5. At 101, NE 140 may transmit at least one NB-MasterInformationBlock to UE 130. At 103, NE 140 may transmit at least one NB-SystemInformationBlock-Type1 to UE 130.

At 105, NE 140 may transmit at least one NB-SystemInformationBlockType2 (SIB2) to UE 130. For example, the at least one SIB2 may include radio resource configuration information, and/or may be associated with RACH configuration, common channel configuration, and/or cell barring configuration. The at least one SIB2 may comprise one or more fields, such as at least one CQI-Reporting-16QAM field. For example, the CQI-Reporting-16QAM field may be similar to:

```
-- ASN1START
SystemInformationBlockType2-NB-r13 ::= SEQUENCE {
    [[ servingCellMeasInfo-16QAM-r117    ENUMERATED {true} OPTIONAL, - Need OR
       cqi-Reporting-16QAM-r17           ENUMERATED {true} OPTIONAL, - Need OR
    ]],
}
```

In NB-IoT, short data transmission in UL and DL is an important use. Currently, uplink data may be transmitted in Msg3 during random access procedure via early data transmission (EDT), or in Msg5. Similarly, downlink data may be transmitted in Msg4. Thus, radquality information may be reported early on during initial access. Rel-14 added the ability to transmit DL channel quality reports in Msg3. The reporting would be based on the number of repetitions required to achieve 1% block error rate (BLER) for the NPDCCH. However, for 16-QAM, the number of repetitions required to achieve 1% BLER is an unsuitable metric since any UE compatible for 16-QAM would not require NPDCCH repetition. Thus, it would be beneficial to develop the type of channel quality information would be suitable for the UE to use for 16-QAM modulation, as well as how NB-IoT UE reports would report channel quality information to a network entity, which could be performed early during initial access and random access procedure and/or when the UE is in CONNECTED mode.

In LTE, a UE may be configured to report channel quality indicator (CQI) information. For example, periodic and aperiodic reporting types may be supported and triggered by downlink control information (DCI). Similarly, in NB-IoT, the UE may report channel quality in Msg3. The channel quality may indicate the number of repetitions required to achieve 1% BLER for the NPDCCH.

3GPP RAN2 #107 established on-demand quality reporting in connected mode. Specifically, the trigger command is defined as a medium access control (MAC) control element The NPRACH configuration described above may refer to the first NPRACH configuration defined by the NPRACH-ConfigSIB-NB IEs.

At 107, UE 130 may transmit at least one Msg1: NPRACH preamble to NE 140, for example, at least one NPRACH configuration 1.

At 109, NE 140 may transmit at least one Msg2: Random access response to UE 130. Furthermore, UE 130 may evaluate at least one criteria. For example, the criteria may include one or more of determining whether UE 130 supports 16-QAM modulation, determining whether NE 140 supports 16-QAM, and determining whether the at least one Msg2: Random access response received from NE 140 includes at least one request for 16-QAM channel quality information.

In certain embodiments, UE 130 may also determine, based upon at least one downlink channel quality measurement of NE 140, that the number of NPDCCH repetitions for 1% BLER does not exceed $R_{max}$ corresponding to CE level 0. Additionally, or alternatively, UE 130 may determine that at least one 16-QAM channel quality information will be reported if the number of NPDCCH repetitions for 1% BLER is less than Rmax/N. N may be configured via system information. Furthermore, UE 130 may determine, based upon at least one downlink channel quality measurement of NE 140, that NRSRP>threshold_16-QAM, where threshold_16-QAM is a parameter indicated in system information.

At 111, UE 130 may transmit at least one Msg3: RRC-ConnectionRequest to NE 140. In various embodiments, at least one existing field in the Msg3: RRCConnectionRequest may include at least one CQI field configured to indicate CQI based on a combination of at least one NPDCCH repetition indication and at least one indication of whether 16-QAM should be used for downlink transmission. The indication may indicate whether 16-QAM can be supported and/or may include additional information such as the coding rate that may be used together with 16-QAM. In certain embodiments, the at least one existing field in the Msg3: RRCConnectionRequest may contain CQI information configured to indicate channel quality in terms of a number of repetitions of NPDCCH.

While Msg3: RRCConnectionRequest may be used as an example of having at least one existing field, any type of RRC message may be configured to have at least one existing field to indicate CQI as described above, such as RRCConnectionRequest-NB, RRCConnectionResumeRequest-NB, RRCEarlyDataRequest-NB and RRCConnectionReestablishmentRequest-NB. As an example, the interpretation of values of CQI-NPDCCH without 16-QAM may be as follows:

| Reported value | NPDCCH repetition level |
|---|---|
| noMeasurement | No measurement reporting |
| candidateRep-A | 1 |
| candidateRep-B | 2 |
| candidateRep-C | 4 |
| candidateRep-D | 8 |
| candidateRep-E | 16 |
| candidateRep-F | 32 |
| candidateRep-G | 64 |
| candidateRep-H | 128 |
| candidateRep-I | 256 |
| candidateRep-J | 512 |
| candidateRep-K | 1024 |
| candidateRep-L | 2048 |

Similarly, wherein UE 130 selects CE-level-0 for RACH access, where NPDCCH is $R_{max}$, and if $R_{max}$ is less than 16, then the above values may be interpreted as:

| Reported value | NPDCCH repetition level |
|---|---|
| noMeasurement | No measurement reporting |
| candidateRep-A | 1 + QPSK |
| candidateRep-B | 2 + QPSK |
| candidateRep-C | 4 + QPSK |
| candidateRep-D | 8 + QPSK |
| candidateRep-E | 16 + QPSK |
| candidateRep-F | 32 + QPSK |
| candidateRep-G | 1 + 16 QAM |
| candidateRep-H | 2 + 16 QAM |
| candidateRep-I | 4 + 16 QAM |
| candidateRep-J | 8 + 16 QAM |
| candidateRep-K | 16 + 16 QAM |
| candidateRep-L | 32 + 16 QAM |

Legacy UE in normal coverage may report values only up to Candidate-Rep-E, assuming the maximum NPDCCH for CE level-0 is 32. Any report above this value may indicate that UE 130 supports new MCS and/or indicates that channel quality may be good enough to use 16 QAM. In various embodiments, a single-bit field may be included with CQI-NPDCCH to indicate that channel quality report must be interpreted according to the second table above by using one of the spare bits. The indication may be also implicit or included as part of another field. In various embodiments, the interpretation may be modified with different combinations when UE 130 supports another modulation scheme. Furthermore, depending on the CQI fields needed for 16-QAM, such as if UE 130 intends to indicate TBS size, different interpretations may also be possible.

In some embodiments, if the criteria at 109 is satisfied, the at least one Msg3: RRCConnectionRequest may include at least one legacy CQI-NPDCCH field and/or at least one new CQI-NPDCCH-16QAM field configured to report 16-QAM information. In some embodiments, the at least one Msg3: RRCConnectionRequest may include at least one field associated with CQI-16QAM-r17, in addition to the legacy CQI-NPDCCH. The at least one field may include at least one indication configured to report at least one extended channel quality report for 16-QAM. Extended channel quality report can refer to extending channel quality report to support 16-QAM modulation or new channel quality report supporting 16-QAM modulation in addition to the existing channel quality report. As an example, the at least one field may be configured as an IE as follows:

```
-- ASN1START
RRCConnectionRequest-NB ::= SEQUENCE {
    criticalExtensions CHOICE {
        rrcConnectionRequest-r13        RRCConnectionRequest-NB-r13-IEs,
        criticalExtensionsFuture  SEQUENCE { }
    }
}
RRCConnectionRequest-NB-r17-IEs ::= SEQUENCE {
    ue-Identity-r13                 InitialUE-Identity,
    establishmentCause-r13          EstablishmentCause-NB-r13,
    multiToneSupport-r13            ENUMERATED {true} OPTIONAL,
    multiCarrierSupport-r13         ENUMERATED {true} OPTIONAL,
    earlyContentionResolution-r14   BOOLEAN,
    cqi-NPDCCH-r14                  CQI-NPDCCH-NB-r14,
    cqi-16QAM-r17                   CQI-16QAM-NB-r17 OPTIONAL,
    spare                           BIT STRING (SIZE (13))
}
-- ASN1STOP
```

In some embodiments, the at least one IE may include 17 spare bits: 4 bits may comprise CQI-16QAM-r17 field, with 13 spare bits remaining.

In various embodiments, UE 130 may select a first NPRACH configuration (CE level 0) for random access procedure. For example, up to 3 NPRACH configurations may be defined in NB-IoT, as shown by the following NPRACH-ConfigSIB-NB IEs:

```
-- ASN1START
NPRACH-ConfigSIB-NB-r13 ::= SEQUENCE {
    nprach-CP-Length-r13              ENUMERATED {us66dot7, us266dot7},
    rsrp-ThresholdsPrachInfoList-r13  RSRP-ThresholdsNPRACH-InfoList-NB-r13 OPTIONAL, --
                                      need OR
    nprach-ParametersList-r13         NPRACH-ParametersList-NB-r13
}
NPRACH-ConfigSIB-NB-v1330 : = SEQUENCE {
    nprach-ParametersList-v1330       NPRACH-ParametersList-NB-v1330
```

```
}
NPRACH-ParametersList-NB-r13 ::=           SEQUENCE (SIZE (1.. maxNPRACH-Resources-NB-
    r13)) OF NPRACHParameters-NB-r13
NPRACH-ParametersList-NB-v1330 ::=         SEQUENCE (SIZE (1.. maxNPRACH-Resources-NB-
                                               r13)) OF NPRACHParameters-NB-v1330
    NPRACH-Parameters-NB -r13::= SEQUENCE {
}
-- ASN1STOP
```

As an example, the first NPRACH configuration above may be used when UE 130 is in good radio condition.

At 113, NE 140 may transmit at least one Msg4:RRCConnectionSetup to UE 130. In certain embodiments, the at least one Msg4:RRCConnectionSetup may comprise at least one 16-QAM measurement configuration. In various embodiments, NE 140 may determine whether or not to configure the 16-QAM mode for UE 130 based on the extended channel quality report in Msg3. In certain embodiments, the at least one Msg4:RRCConnectionSetup may transmit at least one 16-QAM configuration without the at least one 16-QAM measurement configuration. For example, the 16-QAM configuration may comprise at least one indication of 16-QAM support for UE 130. This indication may be configured to enable UE 130 to determine how it decodes or interprets the DCI received from NE 140.

In certain embodiments, if NE 140 configures 16-QAM support for UE 130, NE 140 may optionally configure UE 130 for periodic and/or on-demand channel quality report in CONNECTED mode. For example, NE 140 may configure UE 130 with at least one measurement configuration, such as reference signal, measurement time, measurement trigger or criteria, reporting trigger or criteria, and/or periodic reporting interval. Wherein UE 130 has at least one data transmission with data size below at least one threshold, the at least one 16-QAM measurement configuration may not be needed. Thus, NE 140 may use at least one buffer status report to determine whether this is needed.

At 115, UE 130 may transmit at least one RRCConnectionSetupComplete to NE 140. At 117, UE 130 may perform at least one channel quality measurement. At 119, NE 140 may transmit at least one scheduling grant for UL data transmission to UE 130. At 121, UE 130 may periodically transmit at least one channel measurement report to NE 140.

Figure 2:
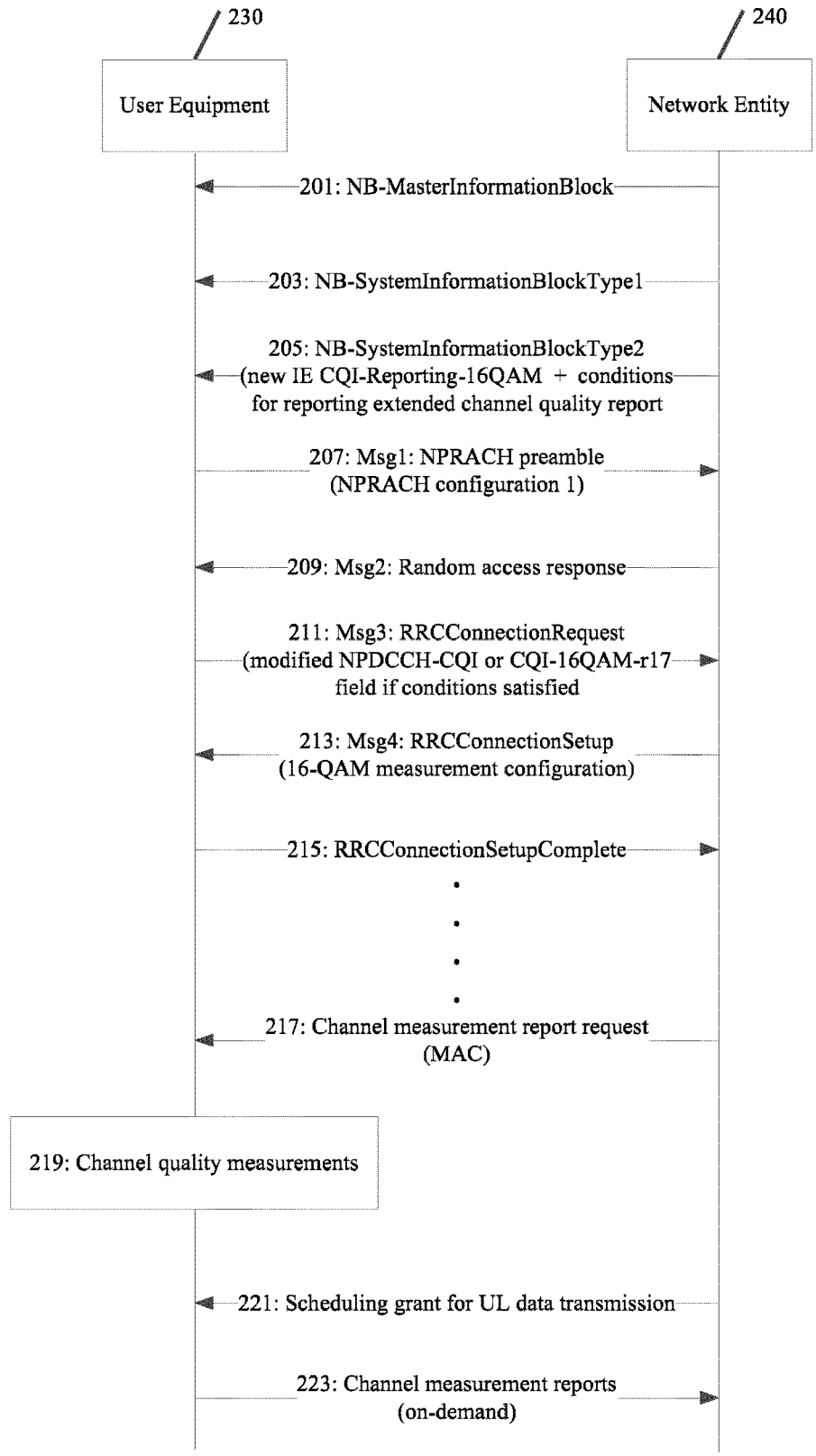
FIG. 2 illustrates another example of a signaling diagram according to certain embodiments.

FIG. 2 illustrates an example of a signaling diagram showing communications between UE 230 and NE 240. UE 230 and NE 240 may be similar to UE 510 and NE 510, as illustrated in FIG. 5, according to certain embodiments. The signalling diagram of FIG. 1, particularly 101-115, may be similar to 201-215.

At 217, NE 240 may transmit at least one channel measurement report request to UE 230, for example, at least one MAC. For on-demand reporting, NE 240 may send at least one MAC message and/or at least one RRC message configured to request at least one channel quality report from UE 230.

At 219, UE 230 may perform at least one channel quality measurement after receiving the at least one MAC message and/or at least one RRC message. Subsequent to at least one measurement period, NE 240 may schedule UE 230 to transmit at least one channel quality measurement report.

At 221, NE 240 may transmit at least one scheduling grant for UL data transmission to UE 230. At 223, UE 230 may transmit at least one channel measurement report to NE 240 (on-demand).

Figure 3:
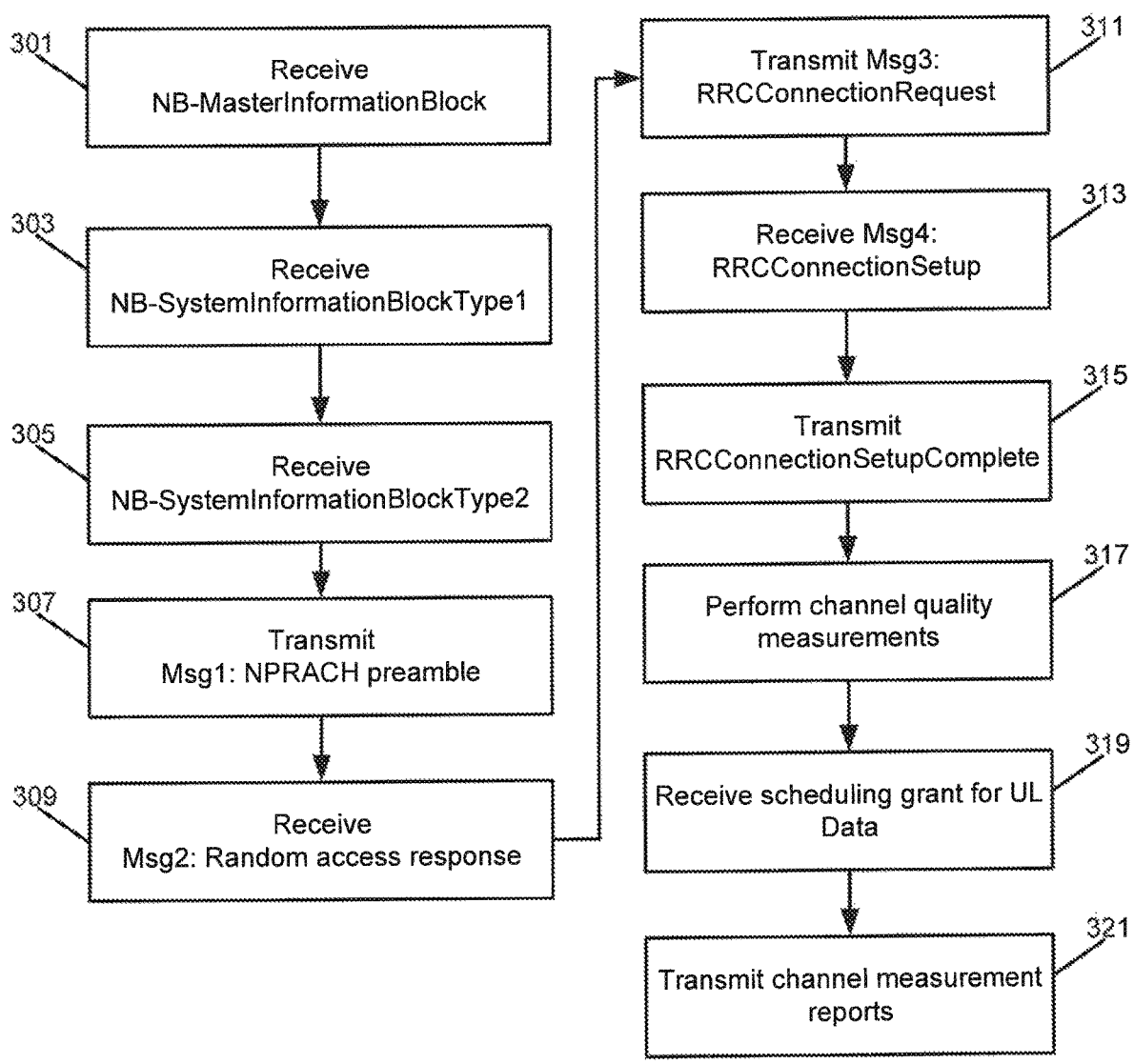
FIG. 3 illustrates an example of a flow diagram of a method performed by a user equipment according to certain embodiments.

FIG. 3 illustrates an example of a flow diagram of a method that may be performed by a UE, such as UE 510 illustrated in FIG. 5, according to certain embodiments. At 301, at least one NB-MasterInformationBlock may be received from a NE, such as NE 520 illustrated in FIG. 5. At 303, at least one NB-SystemInformationBlockType may be received from the NE.

At 305, at least one NB-SystemInformationBlockType2 (SIB2) may be received from the NE. For example, the at least one SIB2 may include radio resource configuration information, and/or may be associated with RACH configuration, common channel configuration, and/or cell barring configuration. The at least one SIB2 may comprise one or more fields, such as at least one CQI-Reporting-16QAM field. For example, the CQI-Reporting-16QAM field may be similar to:

```
-- ASN1START
SystemInformationBlockType2-NB-r13 ::= SEQUENCE {
    [[ servingCellMeasInfo-16QAM-r117    ENUMERATED {true} OPTIONAL, -- Need OR
       cqi-Reporting-16QAM-r17           ENUMERATED {true} OPTIONAL, -- Need OR
    ]],
}
```

The NPRACH configuration described above refers to the first NPRACH configuration defined by the NPRACH-ConfigSIB-NB IEs.

At 307, at least one Msg1: NPRACH preamble may be transmitted to the NE, for example, at least one NPRACH configuration 1. At 309, at least one Msg2: Random access response may be received from the NE. Furthermore, the UE may evaluate at least one criteria. For example, the criteria may include one or more of determining whether the UE supports 16-QAM modulation, determining whether the NE supports 16-QAM, and determining whether the at least one Msg2: Random access response received from the NE includes at least one request for 16-QAM channel quality information.

In certain embodiments, the UE may determine, based upon at least one downlink channel quality measurement of the NE, that the number of NPDCCH repetition for 1% BLER is does not exceed $R_{max}$ corresponding to CE level 0. Additionally or alternatively, the UE may determine that at least one 16-QAM channel quality information will be reported if the number of NPDCCH repetitions for 1% BLER is less than $R_{max}/N$. N can be configured via system information. Furthermore, the UE may determine, based upon at least one downlink channel quality measurement of the NE that NRSRP>threshold_16-QAM, where threshold_16-QAM is a parameter indicated in system information.

At 311, at least one Msg3: RRCConnectionRequest may be transmitted to the NE. In various embodiments, at least one existing field in the Msg3: RRCConnectionRequest may include at least one CQI field configured to indicate CQI based on a combination of at least one NPDCCH repetition indication and at least one indication of whether 16-QAM should be used for downlink transmission. In certain embodiments, the at least one existing field in the Msg3: RRCConnectionRequest may contain CQI information configured to indicate channel quality in terms of a number of repetitions of NPDCCH.

While Msg3: RRCConnectionRequest is used as an example of having at least one existing field, any type of RRC message may be configured to have at least one existing field to indicate CQI as described above, such as RRCConnectionRequest-NB, RRCConnectionResumeRequest-NB, RRCEarlyDataRequest-NB and RRCConnectionReestablishmentRequest-NB. As an example, the interpretation of values of CQI-NPDCCH without 16-QAM may be as follows:

| Reported value | NPDCCH repetition level |
|---|---|
| noMeasurement | No measurement reporting |
| candidateRep-A | 1 |
| candidateRep-B | 2 |
| candidateRep-C | 4 |
| candidateRep-D | 8 |
| candidateRep-E | 16 |
| candidateRep-F | 32 |
| candidateRep-G | 64 |
| candidateRep-H | 128 |
| candidateRep-I | 256 |
| candidateRep-J | 512 |
| candidateRep-K | 1024 |
| candidateRep-L | 2048 |

Similarly, wherein the UE selects CE-level-0 for RACH access, where NPDCCH repetition is $R_{max}$, and if $R_{max}$ is less than 16, then the above values may be interpreted as:

| Reported value | NPDCCH repetition level |
|---|---|
| noMeasurement | No measurement reporting |
| candidateRep-A | 1 + QPSK |
| candidateRep-B | 2 + QPSK |
| candidateRep-C | 4 + QPSK |
| candidateRep-D | 8 + QPSK |
| candidateRep-E | 16 + QPSK |
| candidateRep-F | 32 + QPSK |
| candidateRep-G | 1 + 16 QAM |
| candidateRep-H | 2 + 16 QAM |
| candidateRep-I | 4 + 16 QAM |
| candidateRep-J | 8 + 16 QAM |
| candidateRep-K | 16 + 16 QAM |
| candidateRep-L | 32 + 16 QAM |

Legacy UE in normal coverage may report values only up to Candidate-Rep-E, assuming the maximum NPDCCH for CE level-0 is 32. Any report above this value may indicate that the UE supports new MCS and/or indicates that channel quality may be good enough to use 16 QAM. In various embodiments, a single-bit field may be included with CQI-NPDCCH to indicate that channel quality report must be interpreted according to the second table above by using one of the spare bits. The indication may be also implicit or included as part of another field. In various embodiments, the interpretation may be modified with different combinations when the UE and support another modulation scheme. Furthermore, depending on the CQI fields needed for 16-QAM, such as if the UE intends to indicate TBS size, different interpretations may also be possible.

In some embodiments, if the criteria at 309 is satisfied, the at least one Msg3: RRCConnectionRequest may be similar to CQI-NPDCCH, which may include 16-QAM information. In some embodiments, the at least one at least one Msg3: RRCConnectionRequest may include at least one field associated with CQI-16QAM-r17, in addition to the legacy CQI-NPDCCH. The at least one field may include at least one indication configured to report at least one extended channel quality report for 16-QAM. Extended channel quality report can refer to extending channel quality report to support 16-QAM modulation or new channel quality report supporting 16-QAM modulation in addition to the existing channel quality report. As an example, the at least one field may be configured as an IE as follows:

```
- ASN1START
RRCConnectionRequest-NB ::= SEQUENCE {
    criticalExtensions CHOICE {
        rrcConnectionRequest-r13    RRCConnectionRequest-NB-r13-IEs,
        criticalExtensionsFuture    SEQUENCE { }
    }
}
RRCConnectionRequest-NB-r17-IEs ::= SEQUENCE {
    ue-Identity-r13              InitialUE-Identity,
    establishmentCause-r13       EstablishmentCause-NB-r13,
    multiToneSupport-r13         ENUMERATED {true} OPTIONAL,
    multiCarrierSupport-r13      ENUMERATED {true} OPTIONAL,
    earlyContentionResolution-r14 BOOLEAN,
    cqi-NPDCCH-r14               CQI-NPDCCH-NB-r14,
    cqi-16QAM-r17                CQI-16QAM-NB-r17 OPTIONAL,
    spare                        BIT STRING (SIZE (13))
}
-- ASN1STOP
```

In some embodiments, the at least one IE may include 17 spare bits: 4 bits may comprise CQI-16QAM-r17 field, with 13 spare bits remaining.

In various embodiments, the UE may select a first NPRACH configuration (CE level 0) for random access procedure. For example, up to 3 NPRACH configurations may be defined in NB-IoT, as shown by the following NPRACH-ConfigSIB-NB IEs:

```
-- ASN1START
NPRACH-ConfigSIB-NB-r13 ::= SEQUENCE {
    nprach-CP-Length-r13           ENUMERATED {us66dot7, us266dot7},
    rsrp-ThresholdsPrachInfoList-r13  RSRP-ThresholdsNPRACH-InfoList-NB-r13 OPTIONAL, --
    need OR
    nprach-ParametersList-r13      NPRACH-ParametersList-NB-r13
```

```
}
NPRACH-ConfigSIB-NB-v1330 ::=      SEQUENCE {
   nprach-ParametersList-v1330      NPRACH-ParametersList-NB-v1330
}                                   SEQUENCE (SIZE (1.. maxNPRACH-Resources-NB-
NPRACH-ParametersList-NB-r13 ::=    r13)) OF NPRACHParameters-NB-r13
NPRACH-ParametersList-NB-v1330 ::=  SEQUENCE (SIZE (1.. maxNPRACH-Resources-NB-
                                    r13)) OF NPRACHParameters-NB-v1330
NPRACH-Parameters-NB-r13::= SEQUENCE {
}
-- ASN1STOP
```

As an example, the NPRACH configuration above may used when the UE is in good radio condition.

At 313, at least one Msg4:RRCConnectionSetup may be received from the NE. In certain embodiments, the at least one Msg4:RRCConnectionSetup may comprise at least one 16-QAM measurement configuration. In various embodiments, the NE may determine whether or not to configure the 16-QAM mode for the UE based on the extended channel quality report in Msg3. In certain embodiments, the at least one Msg4:RRCConnectionSetup may transmit at least one 16-QAM configuration without the at least one 16-QAM measurement configuration. For example, the 16-QAM configuration may comprise at least one indication of 16-QAM support for the UE. This indication may be configured to enable the UE to determine how it decodes or interprets the DCI received from the NE.

At 315, at least one RRCConnectionSetupComplete may be transmitted to the NE. At 317, the UE may perform at least one channel quality measurement. At 319, at least one scheduling grant for UL data transmission may be received from the NE. At 321, the UE may periodically transmit at least one channel measurement report to the NE.

Figure 4:
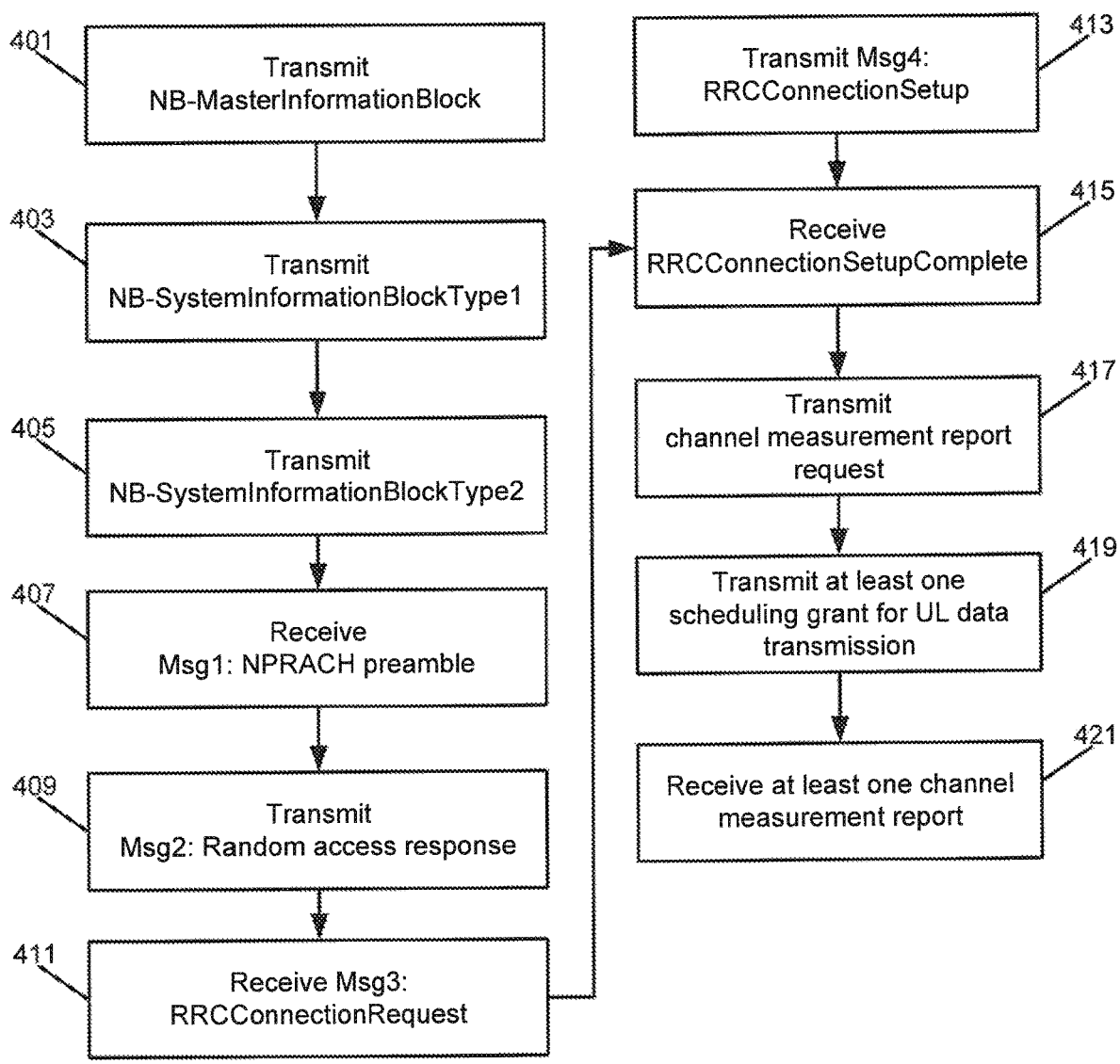
FIG. 4 illustrates an example of a flow diagram of a method performed by a network entity according to certain embodiments.

FIG. 4 illustrates an example of a flow diagram of a method that may be performed by a NE, such as NE 520 illustrated in FIG. 5, according to certain embodiments. At 401, at least one NB-MasterInformationBlock may be transmitted to a UE, such as UE 510 illustrated in FIG. 5, according to certain embodiments. At 403, at least one NB-SystemInformationBlockType 1 may be transmitted to the UE.

At 405, at least one NB-SystemInformationBlockType2 (SIB2) may be transmitted to the UE. For example, the at least one SIB2 may include radio resource configuration information, and/or may be associated with RACH configuration, common channel configuration, and/or cell barring configuration. The at least one SIB2 may comprise one or more fields, such as at least one CQI-Reporting-16QAM field. For example, the CQI-Reporting-16QAM field may be similar to:

```
-- ASNSTART
SystemInformationBlockType2-NB-r13 ::= SEQUENCE {
  [[ servingCellMeasInfo-16QAM-r117  ENUMERATED {true} OPTIONAL, -- Need OR
     cqi-Reporting-16QAM-r17         ENUMERATED {true} OPTIONAL, -- Need OR
  ]],
}
```

The NPRACH configuration described above refers to the first NPRACH configuration defined by the NPRACH-ConfigSIB-NB IEs. At 407, at least one Msg1: NPRACH preamble may be received from the UE, for example, at least one NPRACH configuration 1. At 409, at least one Msg2: Random access response may be transmitted to the UE.

At 411, at least one Msg3: RRCConnectionRequest may be received from the UE. In various embodiments, at least one existing field in the Msg3: RRCConnectionRequest may include at least one CQI field configured to indicate CQI based on a combination of at least one NPDCCH repetition indication and at least one indication of whether 16-QAM should be used for downlink transmission. In certain embodiments, the at least one existing field in the Msg3: RRCConnectionRequest may contain CQI information configured to indicate channel quality in terms of a number of repetitions of NPDCCH.

While Msg3: RRCConnectionRequest may be used as an example of having at least one existing field, any type of RRC message may be configured to have at least one existing field to indicate CQI as described above, such as RRCConnectionRequest-NB, RRCConnectionResumeRequest-NB, RRCEarlyDataRequest-NB and RRCConnectionReestablishmentRequest-NB. As an example, the interpretation of values of CQI-NPDCCH without 16-QAM may be as followed:

| Reported value | NPDCCH repetition level |
|---|---|
| noMeasurement | No measurement reporting |
| candidateRep-A | 1 |
| candidateRep-B | 2 |
| candidateRep-C | 4 |
| candidateRep-D | 8 |
| candidateRep-E | 16 |
| candidateRep-F | 32 |
| candidateRep-G | 64 |
| candidateRep-H | 128 |
| candidateRep-I | 256 |
| candidateRep-J | 512 |
| candidateRep-K | 1024 |
| candidateRep-L | 2048 |

Similarly, wherein the UE selects CE-level-O for RACH access, where NPDCCH repetition is $R_{max}$, and if $R_{max}$ is less than 16, then the above values may be interpreted as:

| Reported value | NPDCCH repetition level |
|---|---|
| noMeasurement | No measurement reporting |
| candidateRep-A | 1 + QPSK |
| candidateRep-B | 2 + QPSK |
| candidateRep-C | 4 + QPSK |

| Reported value | NPDCCH repetition level |
| --- | --- |
| candidateRep-D | 8 + QPSK |
| candidateRep-E | 16 + QPSK |
| candidateRep-F | 32 + QPSK |
| candidateRep-G | 1 + 16 QAM |
| candidateRep-H | 2 + 16 QAM |
| candidateRep-I | 4 + 16 QAM |
| candidateRep-J | 8 + 16 QAM |
| candidateRep-K | 16 + 16 QAM |
| candidateRep-L | 32 + 16 QAM |

Legacy UE in normal coverage may report values only up to Candidate-Rep-E, assuming the maximum NPDCCH for CE level-O is 32. Any report above this value may indicate that the UE supports new MCS and/or indicates that channel quality may be good enough to use 16 QAM. In various embodiments, a single-bit field may be included with CQI-NPDCCH to indicate that channel quality report must be interpreted according to the second table above by using one of the spare bits. The indication may be also implicit or included as part of another field. In various embodiments, the interpretation may be modified with different combinations when the UE and support another modulation scheme.

```
-- ASN1START
RRCConnectionRequest-NB ::= SEQUENCE {
    criticalExtensions CHOICE {
        rrcConnectionRequest-r13    RRCConnectionRequest-NB-r13-IEs,
        criticalExtensionsFuture    SEQUENCE { }
    }
}
RRCConnectionRequest-NB-r17-IEs ::= SEQUENCE {
    ue-Identity-r13              InitialUE-Identity,
    establishmentCause-r13       EstablishmentCause-NB-r13,
    multiToneSupport-r13         ENUMERATED {true} OPTIONAL,
    multiCarrierSupport-r13      ENUMERATED {true} OPTIONAL,
    earlyContentionResolution-r14 BOOLEAN,
    cqi-NPDCCH-r14               CQI-NPDCCH-NB-rl4,
    cqi-16QAM-r17                CQI-16QAM-NB-r17 OPTIONAL,
    spare                        BIT STRING (SIZE (13))
}
-- ASN1STOP
```

In some embodiments, the at least one IE may include 17 spare bits: 4 bits may comprise CQI-16QAM-r17 field, with 13 spare bits remaining.

In various embodiments, the UE may select a first NPRACH configuration (CE level 0) for random access procedure. For example, up to 3 NPRACH configurations may be defined in NB-IoT, as shown by the following NPRACH-ConfigSIB-NB IEs:

```
-- ASN1START
NPRACH-ConfigSIB-NB-r13 ::= SEQUENCE {
nprach-CP-Length-r13              ENUMERATED {us66dot7, us266dot7},
rsrp-ThresholdsPrachInfoList-r13  RSRP-ThresholdsNPRACH-InfoList-NB-r13 OPTIONAL, --
                                  need OR
nprach-ParametersList-r13         NPRACH-ParametersList-NB-r13
}
NPRACH-ConfigSIB-NB-v1330::= SEQUENCE {
    nprach-ParametersList-v 1330   NPRACH-ParametersList-NB -v 13 3 0
}
NPRACH-ParametersList-NB-r13 ::=    SEQUENCE (SIZE (1.. maxNPRACH-Resources-NB-
                                    r13)) OF NPRACHParameters-NB-r13
NPRACH-ParametersList-NB-v1330 ::=  SEQUENCE (SIZE (1.. maxNPRACH-Resources-NB-
                                    r13)) OF NPRACHParameters-NB-v1330
NPRACH-Parameters-NB -r 13::= SEQUENCE {
}
-- ASN1STOP
```

Furthermore, depending on the CQI fields needed for 16-QAM, such as if the UE intends to indicate TBS size, different interpretations may also be possible.

In some embodiments, if the criteria at 411 is satisfied, the at least one Msg3: RRCConnectionRequest may be similar to CQI-NPDCCH, which may include 16-QAM information. In some embodiments, the at least one at least one Msg3: RRCConnectionRequest may include at least one field associated with CQI-16QAM-r17, in addition to the legacy CQI-NPDCCH. The at least one field may include at least one indication configured to report at least one extended channel quality report for 16-QAM. Extended channel quality report can refer to extending channel quality report to support 16-QAM modulation or new channel quality report supporting 16-QAM modulation in addition to the existing channel quality report. As an example, the at least one field may be configured as an IE as follows:

As an example, the NPRACH configuration above may be used when the UE is in good radio condition.

At 413, at least one Msg4:RRCConnectionSetup may be transmitted to the UE. In certain embodiments, the at least one Msg4:RRCConnectionSetup may comprise at least one 16-QAM measurement configuration. In various embodiments, the NE may determine whether or not to configure the 16-QAM mode for the UE based on the extended channel quality report in Msg3. In certain embodiments, the at least one Msg4:RRCConnectionSetup may transmit at least one 16-QAM configuration without the at least one 16-QAM measurement configuration. For example, the 16-QAM configuration may comprise at least one indication of 16-QAM support for the UE. This indication may be configured to enable the UE to determine how it decodes or interprets the DCI received from the NE.

In certain embodiments, if the NE configures 16-QAM support for the UE, the NE may optionally configure the UE for periodic and/or on-demand channel quality report in CONNECTED mode. For example, the NE may configure the UE with at least one measurement configuration, such as reference signal, measurement time, and/or periodic reporting interval. Wherein the UE has at least one data transmission with data size below at least one threshold, the at least one 16-QAM measurement configuration may not be needed. Thus, the NE may use at least one buffer status report to determine whether this is needed.

At 415, at least one RRCConnectionSetupComplete may be received from the UE. At 417, at least one channel measurement report request may be transmitted to the UE, for example, at least one MAC. For on-demand reporting, the NE may send at least one MAC and/or at least one RRC message configured to request at least one channel quality report to the UE.

At 419, NE 240 may transmit at least one scheduling grant for UL data transmission to UE 230. At 421, at least one channel measurement report may be received from the UE.

FIG. 5 illustrates an example of a system according to certain embodiments. In one embodiment, a system may include multiple devices, such as, for example, user equipment 510 and/or network entity 520.

User equipment 510 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

Network entity 520 may be one or more of a base station, such as an evolved node B (eNB) or 5G or New Radio node B (gNB), a serving gateway, a server, and/or any other access node or combination thereof. Network entity 520 may also be similar to user equipment 510. Furthermore, user equipment 510 and/or network entity 520 may be one or more of a citizens broadband radio service device (CBSD).

One or more of these devices may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 512 and 522. The memory may be fixed or removable. The memory may include computer program instructions or computer code contained therein. Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 511 and 521 and memories 512 and 522 or a subset thereof, may be configured to provide means corresponding to the various blocks of FIGS. 1-4. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple radio access technologies. Other configurations of these devices, for example, may be provided. Transceivers 513 and 523 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 6:
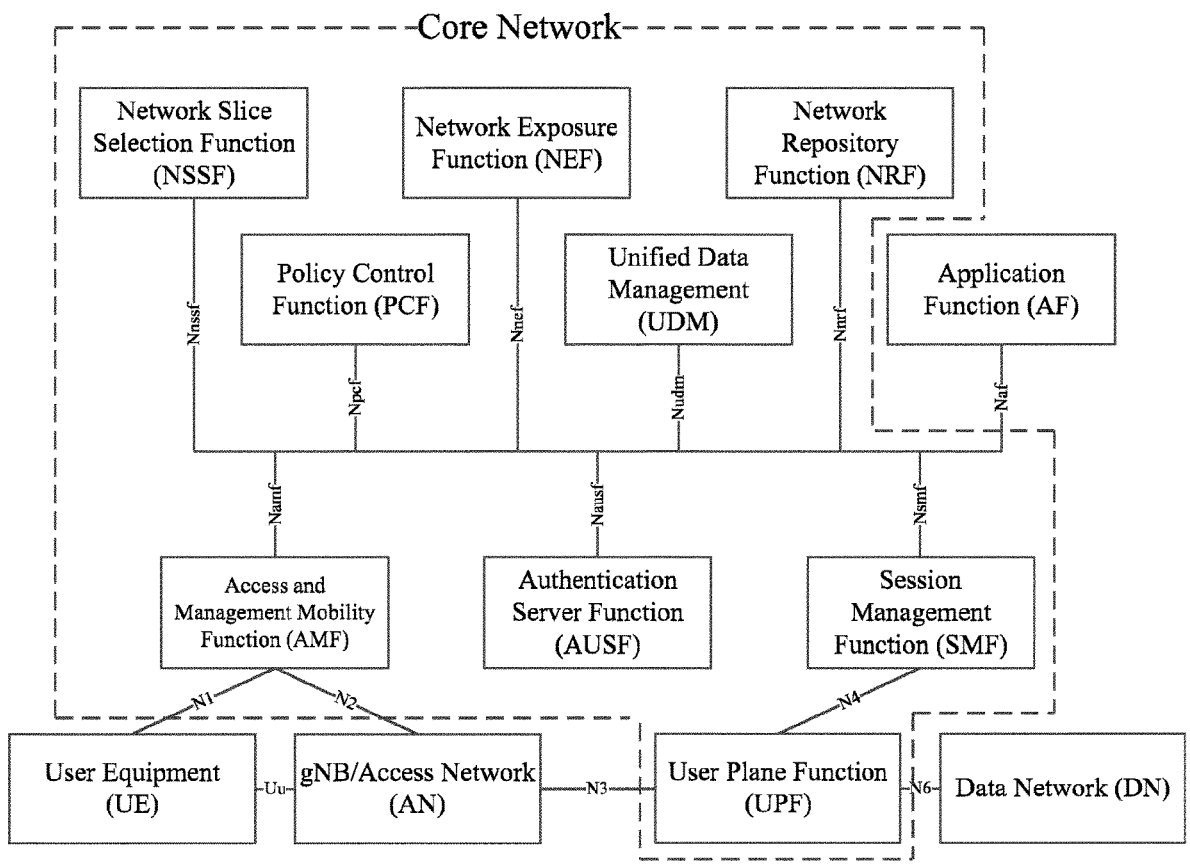
FIG. 6 illustrates an example of a 5G network and system architecture according to certain embodiments.

FIG. 6 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 6 may be similar to UE 510 and NE 520, respectively. The UPF may provide services such as intra-RAT and inter-RAT mobility, routing and forwarding of data packets, inspection of packets, user plane QoS processing, buffering of downlink packets, and/or triggering of downlink data notifications. The AF may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for extended channel quality reporting is not intended to limit the scope of certain embodiments, but is instead representative of selected example embodiments.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

3GPP Third Generation Partnership Project
5G Fifth Generation
ASIC Application Specific Integrated Circuit
BLER Block Error Rate
BS Base Station
CE Coverage Enhanced
CE Control Element
CPU Central Processing Unit
CQI Channel Quality Indicator
DCI Downlink Control Information
DL Downlink
EDT Early Data Transmission
eMBB Enhanced Mobile Broadband
eNB Evolved Node B
EPS Evolved Packet System
E-UTRAN Evolved Universal Mobile Telecommunications System
Terrestrial Radio Access Network
gNB Next Generation Node B
GPS Global Positioning System
HDD Hard Disk Drive
IE Information Element
IoT Internet of Things
LCID Logical Control Identifier
LTE Long-Term Evolution
MAC Medium Access Control
MCS Modulation Coding Scheme
M2M Machine-to-Machine
MEMS Micro Electrical Mechanical System
MIMO Multiple Input Multiple Output
MME Mobility Management Entity
mMTC massive Machine Type Communication
MTC Machine Type Communication
NAS Non-Access Stratum
NB-IoT Narrow Band Internet of Things
NRSRP Narrowband Reference Signal Received Power
NE Network Entity
NG Next Generation
NG-RAN Next Generation Radio Access Network
NPDCCH Narrow Band PDCCH
NPDSCH Narrow Band PDSCH
NPRACH Narrow Band PRACH
NR New Radio
PDA Personal Digital Assistance
PDCCH Physical Downlink Control Channel
PDSCH Physical Downlink Sharing Channel
QAM Quadrature Amplitude Modulation
QoS Quality of Service
PRACH Physical Random Access Channel
PRB Physical Resource Block
RAM Random Access Memory
RAN Radio Access Network
RRC Radio Resource Control
RX Receiver
TB Transport Block
TBS Transport Block Size
TS Technical Specification
TX Transmission
UE User Equipment
UL Uplink
UMTS Universal Mobile Telecommunications Service
URLLC Ultra-Reliable and Low-Latency Communication
UTRAN Universal Mobile Telecommunications Service Terrestrial Radio Access Network
WI Work Item
WLAN Wireless Local Area Network

We claim:

1. An apparatus, comprising:
at least one processor; and
at least one memory storing instructions that, when executed by the at least one processor, cause the apparatus at least to:
transmit to at least one user equipment (UE) at least one configuration of channel quality indication (CQI) comprising at least one indication of whether downlink transmissions associated with 16-quadrature amplitude modulation (16-QAM) is supported;
transmit to the at least one UE at least one 16-QAM measurement configuration comprising at least an indication that the at least one UE may transmit and receive using 16-QAM; and
receive, based upon at least one condition being satisfied, from the at least one UE, at least one extended CQI report.

2. The apparatus of claim 1, wherein the at least one extended CQI report comprises one or more of: at least one indicator configured to cause the apparatus to reinterpret at least one legacy field; at least one field configured to indicate 16-QAM support and at least one modulation coding scheme (MCS) combination; or at least one CQI report configured for 16-QAM.

3. The apparatus of claim 1, wherein the at least one memory further stores instructions that, when executed by the at least one processor, cause the apparatus at least to:
transmit information on the at least one condition associated with reporting the at least one extended CQI report by the at least one UE.

4. The apparatus of claim 1, wherein the at least one condition comprises one or more of: the at least one UE supporting 16-QAM; the apparatus supporting 16-QAM; or at least one message transmitted to the at least one UE comprising at least one request for 16-QAM channel quality indication.

5. The apparatus of claim 4, wherein the at least one condition further comprises at least one of: at least one field of CQI reporting for 16-QAM associated with system information block type 2 for narrowband; or at least one parameter configured to indicate at least one threshold of the CQI reporting for 16-QAM.

6. The apparatus of claim 1, wherein the at least one memory further stores instructions that, when executed by the at least one processor, cause the apparatus at least to: select at least one narrow band physical random access channel configuration configured for at least one random access procedure.

7. The apparatus of claim 1, wherein the at least one memory further stores instructions that, when executed by the at least one processor, cause the apparatus at least to: determine, based upon at least one downlink channel quality measurement of at least one serving cell, that a number of narrow band physical random access channel repetitions associated with a specific block error rate is less than at least one threshold associated with coverage enhancement level 0.

8. The apparatus of claim 1, wherein the at least one memory further stores instructions that, when executed by the at least one processor, cause the apparatus at least to: determine to perform downlink transmission according to CQI for 16-QAM where a number of narrow band physical random access channel repetitions for a specific block error rate is less than at least one threshold associated with coverage enhancement level 0 divided by a parameter configured via system information.

9. A method, comprising:
receiving from at least one network entity, by a user equipment (UE), at least one configuration of channel quality indication (CQI) comprising at least one indication of whether downlink transmissions associated with 16-quadrature amplitude modulation (16-QAM) are supported;
receiving from the at least one network entity at least one 16-QAM measurement configuration comprising at least an indication that the UE may transmit and receive using 16-QAM; and
transmitting by the UE, based upon at least one condition being satisfied, to the at least one network entity, at least one extended CQI report.

10. The method of claim 9, wherein the at least one extended CQI report comprises one or more of: at least one indicator configured to cause the at least one network entity to reinterpret at least one legacy field; at least one field configured to indicate 16-QAM support and at least one modulation coding scheme (MCS) combination; or at least one CQI report configured for 16-QAM.

11. The method of claim 9, wherein the at least one condition comprises one or more of: the UE supporting 16-QAM; the at least one network entity supporting 16-QAM; or at least one message received by the UE comprising at least one request for 16-QAM channel quality indication.

12. The method of claim 9, wherein the at least one 16-QAM measurement configuration further comprises one or more of: at least one reference signal, at least one measurement time, or at least one periodic reporting interval.

13. The method of claim 9, wherein the at least one condition further comprises at least one of: at least one field of channel CQI reporting for 16-QAM associated with system information block type 2 for narrowband; or at least one parameter configured to indicate at least one threshold for CQI reporting for 16-QAM.

14. An apparatus, comprising:
at least one processor; and
at least one memory storing instructions that, when executed by the at least one processor, cause the apparatus at least to:
receive from at least one network entity at least one configuration of channel quality indication (CQI) comprising at least one indication of whether downlink transmissions associated with 16-quadrature amplitude modulation (16-QAM) are supported;
receive from the at least one network entity at least one 16-QAM measurement configuration comprising at least an indication that the apparatus may transmit and receive using 16-QAM; and
transmit, based upon at least one condition being satisfied, to the at least one network entity, at least one extended CQI report.

15. The apparatus of claim 14, wherein the at least one extended CQI report comprises one or more of: at least one indicator configured to cause the at least one network entity to reinterpret at least one legacy field; at least one field configured to indicate 16-QAM support and at least one modulation coding scheme (MCS) combination; or at least one CQI report configured for 16-QAM.

16. The apparatus of claim 14, wherein the at least one memory further stores instructions that, when executed by the at least one processor, cause the apparatus at least to: receive information on the at least one condition associated with reporting the at least one extended CQI report.

17. The apparatus of claim 14, wherein the at least one condition comprises one or more of: the apparatus supporting 16-QAM; the at least one network entity supporting 16-QAM; or at least one message received by the apparatus comprising at least one request for 16-QAM channel quality indication.

18. The apparatus of claim 17, wherein the at least one 16-QAM measurement configuration further comprises one or more of: at least one reference signal, at least one measurement time, or at least one periodic reporting interval.

19. The apparatus of claim 14, wherein the at least one condition further comprises at least one of: at least one field of CQI reporting for 16-QAM associated with system information block type 2 for narrowband; or at least one parameter configured to indicate at least one threshold for CQI reporting for 16-QAM.

20. The apparatus of claim 14, wherein:
the at least one extended CQI report comprises at least one CQI report configured for 16-QAM; and
the at least one condition comprises the apparatus supporting 16-QAM.

* * * * *